United States Patent
Chaudhari et al.

(10) Patent No.: US 7,228,279 B2
(45) Date of Patent: Jun. 5, 2007

(54) AUTOMATED DECISION MAKING USING TIME-VARYING STREAM RELIABILITY PREDICTION

(75) Inventors: Upendra V. Chaudhari, Briarcliff Manor, NY (US); Chalapathy Neti, Yorktown Heights, NY (US); Gerasimos Potamianos, White Plains, NY (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 10/397,762

(22) Filed: Mar. 26, 2003

(65) Prior Publication Data

US 2004/0193415 A1    Sep. 30, 2004

(51) Int. Cl.
*G10L 17/00* (2006.01)
(52) U.S. Cl. .................................. 704/273
(58) Field of Classification Search ............ None
See application file for complete search history.

(56) References Cited

U.S. PATENT DOCUMENTS

| | | | | |
|---|---|---|---|---|
| 6,000,833 | A * | 12/1999 | Gershenfeld et al. | 84/600 |
| 6,594,629 | B1 * | 7/2003 | Basu et al. | 704/251 |
| 6,625,569 | B2 * | 9/2003 | James et al. | 702/183 |
| 6,816,836 | B2 * | 11/2004 | Basu et al. | 704/270 |

OTHER PUBLICATIONS

G. Doddington et al., "Sheep, Goats, Lambs, and Wolves: An Analysis of Individual Differences in Speaker Recognition Performance," NIST Presentation at ICSLP98, Sydney, Australia, 14 pages, Nov. 1999.

B. Maison et al., "Audio-Visual Speaker Recognition for Video Broadcast News: Some Fusion Techniques," IEEE Multimedia Signal Processing (MMSP99), Denmark, 4 pages, Sep. 1999.

G. Potamianos et al., "A Cascade Visual Front End for Speaker Independent Automatic Speechreading," International Journal of Speech Technology, vol. 4, pp. 193-208, 2001.

B. Xiang et al., "Short-Time Gaussianization for Robust Speaker Verification," Proceedings of ICASSP, Orlando, Florida, pp. I-681-I-684, May 2002.

D.A. Reynolds et al., "Robust Text-Independent Speaker Identification Using Gaussian Mixture Speaker Models," IEEE Transactions on Speech and Audio Processing, vol. 3, No. 1, pp. 72-83, Jan. 1995.

U.V. Chaudhari et al., "Transformation Enhanced Multi-Grained Modeling for Text-Independent Speaker Recognition," Proceedings of the International Conference on Spoken Language Processing (ICSLP), Beijing, 4 pages, Oct. 2000.

R.A. Gopinath, "Maximum Likelihood Modeling with Gaussian Distributions for Classification," Proceedings of ICASSP, Seattle, 4 pages, May 1998.

* cited by examiner

*Primary Examiner*—Susan McFadden
(74) *Attorney, Agent, or Firm*—Anne V. Dougherty; Ryan, Mason & Lewis, LLP (57) ABSTRACT

Automated decision making techniques are provided. For example, a technique for generating a decision associated with an individual or an entity includes the following steps. First, two or more data streams associated with the individual or the entity are captured. Then, at least one time-varying measure is computed in accordance with the two or more data streams. Lastly, a decision is computed based on the at least one time-varying measure. One form of the time-varying measure may include a measure of the coverage of a model associated with previously-obtained training data by at least a portion of the captured data. Another form of the time-varying measure may include a measure of the stability of at least a portion of the captured data. While either measure may be employed alone to compute a decision, preferably both the coverage and stability measures are employed. The technique may be used to authenticate a speaker.

19 Claims, 5 Drawing Sheets

| CONFIG | DATA SET | |
|---|---|---|
| | ALL | 100SPKR |
| AUDIO, $X^a$ | 98.2% | 98.0% |
| VIDEO, $X^v$ | 75.4% | 89.1% |
| AUDIO+VIDEO, $X^{av}$ | 69.1% | 90.7% |

FIG. 6

| | CONFIG | | |
|---|---|---|---|
| | $\Psi(\Phi=0)$ | $\Phi(\Psi=0)$ | $\Psi\&\Phi$ |
| 100 SPKR | 99.3% | 99.1% | 99.6% |
| CHANGED SPKRS | AUDIO ONLY | | $\Psi\&\Phi$ |
| | 95.5% | | 99.5% |

FIG. 7

AUTOMATED DECISION MAKING USING TIME-VARYING STREAM RELIABILITY PREDICTION

FIELD OF THE INVENTION

The present invention relates to automated decision making techniques such as speaker authentication and, more particularly, to techniques for generating such decisions using time-varying stream reliability prediction in accordance with multiple data streams.

BACKGROUND OF THE INVENTION

The decision making process of authenticating (e.g., recognizing, identifying, verifying) a speaker is an important step in ensuring the security of systems, networks, services and facilities, both for physical and for logical access. However, accurate speaker authentication is also a goal in applications other than secure access-based applications.

Some existing automated speaker authentication techniques rely exclusively on an audio stream captured from the speaker being authenticated. However, it is known that, even in the case of clean speech (e.g., speech collected over a high quality microphone in an environment with little noise), as opposed to the case of degraded speech (e.g., speech collected over noisy phone lines or in environments with substantial background noise and distortion), there exists a subset of the population for which audio-based authentication is problematic and inconsistent. For example, in G. Doddington et al., "Sheep, Goats, Lambs and Wolves: An Analysis of Individual Differences in Speaker Recognition Performance," NIST Presentation at ICSLP98, Sydney, Australia, November 1999, it is shown that there are speakers, termed "goats," who are difficult to recognize based on their voice. Speakers who are readily recognized based on voice are termed "sheep."

Thus, other existing automated speaker authentication techniques have adopted an approach wherein, in addition to the use of the audio stream, a video stream representing the speaker is taken into account, in some manner, in making the speaker authentication decision.

In accordance with such two-stream systems, one may manually choose to make an a priori decision as to the efficacy of audio data versus video data for each individual and subsequently use only the data corresponding to the most effective modality.

Another option is to model the joint statistics of the data streams. However, a more flexible option is to create models independently for each data modality and utilize scores and decisions from both. Previous studies utilizing independent models, such as those detailed in B. Maison et al., "Audio-Visual Speaker Recognition for Video Broadcast News: Some Fusion Techniques," IEEE Multimedia Signal Processing (MMSP99), Denmark, September 1999, have been applied only at the test utterance level in the degraded speech case.

SUMMARY OF THE INVENTION

The present invention provides improved, automated decision making techniques. As will be explained herein, such techniques preferably employ a time-varying stream reliability prediction methodology in accordance with data obtained from multiple data streams associated with an individual or entity. Advantageously, the improved decision making techniques of the invention provide a higher degree of accuracy than is otherwise achievable with existing approaches.

In one aspect of the invention, a technique for generating a decision associated with an individual or an entity includes the following steps. First, two or more data streams associated with the individual or the entity are captured. Then, at least one time-varying measure is computed in accordance with the two or more data streams. Lastly, a decision is computed based on the at least one time-varying measure.

One form of the time-varying measure may include a measure of the coverage of a model associated with previously-obtained training data by at least a portion of the captured data. The coverage measure may be determined in accordance with an inverse likelihood computation. The inverse likelihood computation may include modeling, for a time t, a neighborhood of a test vector associated with the captured data to generate a test data model, and measuring the likelihood of one or more parameters of the training data model with respect to the test data model. Also, the feature space associated with the test data model may be transformed into the feature space associated with the training data model.

Another form of the time-varying measure may include a measure of the stability of at least a portion of the captured data. The stability measure may be determined in accordance with a deviation computation. The deviation computation may include computing a deviation of a score at time t from a point estimate of the score at time t based on a neighborhood of test vectors associated with the captured data.

While either measure may be employed alone to compute a decision, preferably both the coverage and stability measures are employed.

Furthermore, in one illustrative embodiment of the invention, a time-varying, context dependent information fusion methodology may be provided for multi-stream authentication based on audio and video data collected during a user's interaction with a system implementing the methodology. Scores obtained from the two data streams may be combined based on the relative local richness (e.g., coverage), as compared to the training data or derived model, and stability of each stream. Then, an authentication decision may be made based on these determinants.

Results show that the techniques of the invention may outperform the use of video or audio data alone, as well as the use of fused data streams (via concatenation). Of particular note is that the performance improvements may be achieved for clean, high quality speech, whereas previous efforts focused only on degraded speech conditions.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using exemplary data streams associated with a speaker, such as an audio data stream and a video data stream. An embodiment where another data stream (e.g., a data stream representing global positioning system (GPS) data) is employed will also be described. It should be understood, however, that the invention is not limited to use with any particular type of data streams or any particular type of decision. The invention is instead more generally applicable for use with any data that may be associated with an individual or entity, such that a decision associated with the individual or entity may be accurately computed via multiple data streams using one or both of the time-varying measures of the invention. Also, by use herein of the phrase "multiple data streams," it is generally meant that the invention can operate with two or more data streams. Further, while the description focuses on an individual (e.g., speaker), the techniques of the invention are equally applicable for use with entities. It is to be appreciated that an entity can, for example, be a group of individuals, automated agents, etc.

Figure 1:
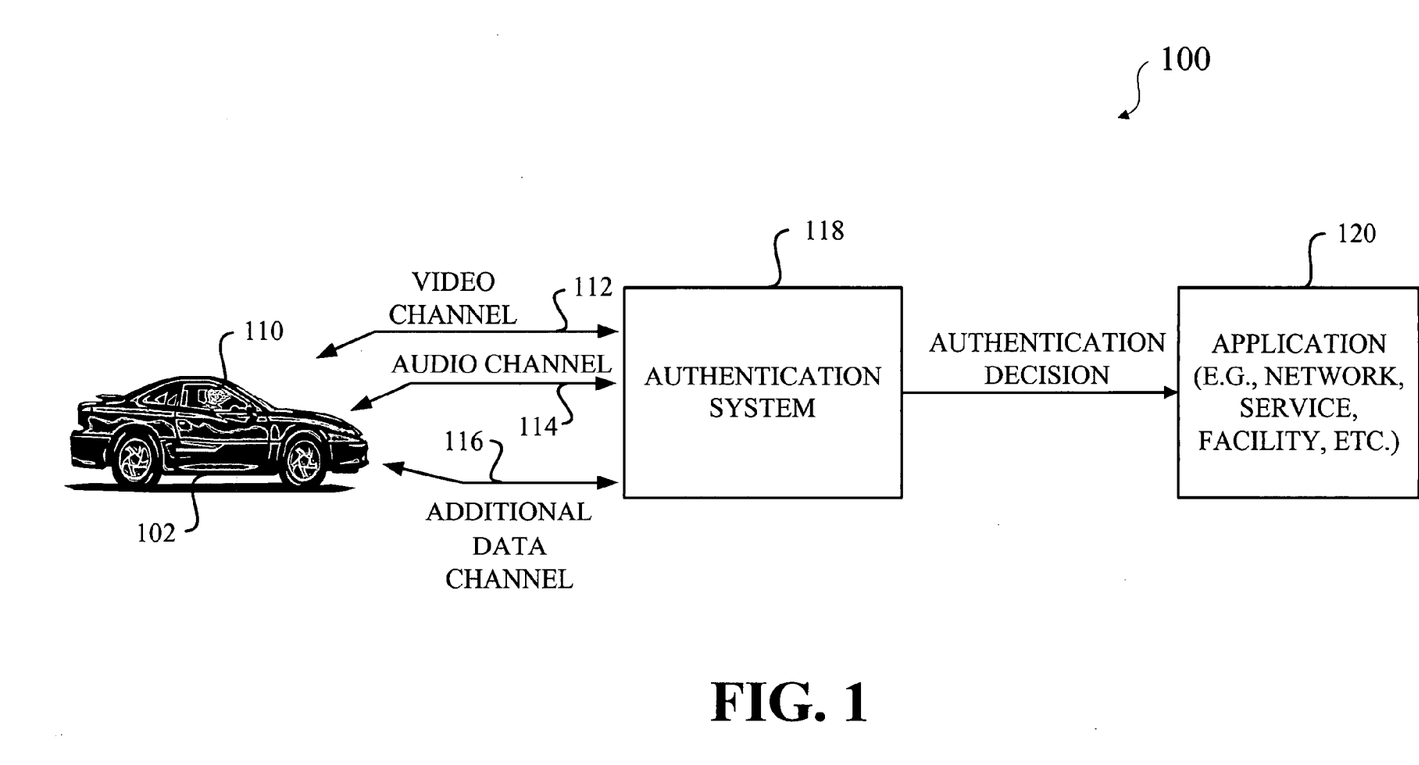
FIG. 1 is a block diagram illustrating an authentication system and an environment in which the system may be used, according to an embodiment of the resent invention.

Referring initially to FIG. 1, a block diagram illustrates an authentication system and an environment in which the system may be used, according to an embodiment of the present invention. More specifically, the arrangement 100 in FIG. 1 illustrates a vehicle 102, a speaker 110, a video channel 112, an audio channel 114, an additional data channel 116, an authentication system 1 18 and an application 120.

Thus, in the illustrative embodiment shown, multiple data streams are obtained from a speaker 110 located in vehicle 102 via the audio, video and additional data channels 112, 114 and 116.

Audio data may be obtained via one or more microphones and audio processing equipment positioned in the vehicle 102 for capturing and processing the individual's spoken utterances such that an audio data stream representative of the utterances is produced. An audio stream is provided to the authentication system 118 via audio channel 114. The vehicle may also be equipped with audio processing equipment and an audio output device to enable audio prompts to be presented to the individual to evoke certain audio responses from the individual.

Further, video data may be obtained via one or more video cameras or sensors and video processing equipment positioned in the vehicle 102 for capturing and processing images of the individual such that a video data stream representative of images associated with the individual is produced. A video stream is provided to the authentication system 118 via video channel 112.

Still further, where additional data (in this case, data other than audio and video data) is being used by the authentication system, the additional data may be obtained directly from a data source. For example, where GPS data is being used, the authentication system 118 may obtain the GPS data via the data channel 116 from a GPS device (not shown) in the vehicle 102, or the GPS data may be obtained via another source. It is to be understood that the GPS data may be used to assist in authentication by providing an indication of where the individual is located.

It is to be understood that more types of data may be obtained by the authentication system 118 via additional channels.

The specific operations of the authentication system 118 will be described in detail below and with reference to FIGS. 2–5. In general, the authentication system 118 authenticates a speaker using time-varying stream reliability prediction, as will be described in detail below, based on data obtained from multiple data streams.

The authentication decision determined by the authentication system 118 is provided to the application 120. If the decision is that the speaker 110 is authenticated, then the speaker is given access to the application 120. If the speaker is not authenticated, then the speaker is not given access to the application 120 (or is given limited access). By "access to an application," it is generally meant that the speaker may then interact with some network, service, facility, etc. The invention is not limited by the type of secure access-based application in any way. Further, the invention is not limited to use with any particular type of application.

It is to be understood that all of the components shown in and referred to in the context of FIG. 1 may be implemented in vehicle 102. However, this is not a necessity. That is, the authentication system 118 and/or application 120 may be located remote from the vehicle 102. For example, the authentication system 118 and/or application 120 may be implemented on one or more servers in communication (wired and/or wireless) with the data capture devices (e.g., microphones, video cameras, GPS devices, etc.) positioned in the vehicle 102. Also, as mentioned above, it is to be understood that the invention is not intended to be limited to use in the particular arrangement (e.g., vehicle-based arrangement) illustrated in FIG. 1.

Given the illustrative arrangement described above, time-varying stream reliability prediction techniques for use by an authentication system according to the present invention will now be explained in detail below.

In general, user authentication based on a speaker's interaction with any system is based on the information that the system collects. The present invention realizes that it is possible and desirable to exploit multiple forms of information obtained by different transducers (data capture devices). Preferably, the transducers are operating simultaneously. In particular, the invention realizes that a significant benefit can be obtained by analyzing the correlation in the multiple data streams. More significantly, however, any subset of the data streams form a context for the analysis of any other subset of streams, allowing the formulation of a robust time-varying fusion methodology.

In the illustrative embodiment to follow, it is to be understood that only audio and video data streams are used.

Recall however that FIG. 1 shows that additional data (e.g., GPS data) may be employed in the methodology. The addition of this other data type is straightforward given the following detailed explanation of how audio and video data streams are processed to make an authentication decision. Nonetheless, the use of a third data type will be explained in the context of FIG. 4.

The present invention provides a time-varying approach to multi-stream analysis where, in general, the fusion of data, scores, and decisions occur locally in time at the stream element level and relative to a local "context" that includes a measure of data richness and data consistency. Herein, a combination of these two properties (i.e., data richness and data consistency) may be generally referred to as "reliability." The present invention realizes that the reliability of each data stream varies with time as the interaction proceeds and performance gains can be achieved by using this knowledge intelligently.

As mentioned above, even in the clean speech case, there exists a subset of the population for which audio-based authentication is problematic and inconsistent. Thus, the present invention provides methods for predicting the reliability of the data streams. It may turn out for any point in time that only audio, only video, or a combination of the two streams are used. And this combining process is time varying in that the reliability is modeled locally as a function of time and other signal properties.

Thus, as will be seen, the invention realizes that an optimal approach to speaker authentication is to model the multiple data streams independently and make an intelligent, time-varying decision as to which model to use and/or how to combine scores for each point in time. The results presented herein are significant in that improvement in speaker recognition performance may be obtained for the high quality, clean speech case (as evidenced by overall audio performance) by adding, for example, video stream data and performing a time-varying analysis.

A description of the data streams or feature streams that may be employed in accordance with an illustrative embodiment of the invention will now be provided. With reference back to FIG. 1, it is to be understood that the video stream and the audio stream are provided on video and audio channels 112 and 114, respectively. A vector-wise concatenation of the audio and video streams is also generated from the two streams. It is to be appreciated that such feature streams may be generated in the processing equipment associated with the input devices that captured the raw data, or the feature streams may be generated in the authentication system 118 once the authentication system receives the raw data streams from the input devices.

In any case, simultaneous recordings of audio and video data are used to produce three vector streams of interest: $X^a = \{x_t^a\}$ (audio), $X^v = \{x_t^v\}$ (video), and $X^{av} = \{x_t^{av}\}$ (vector-wise concatenation of audio and video streams).

In particular, the audio stream may preferably include mean normalized, 23 dimensional, Mel frequency cepstral coefficient (MFCC) vectors (no C0) computed using 24 filters. Of course, other audio feature vectors may be employed.

Further, visual features may preferably be extracted using an appearance-based technique. For example, the appearance-based techniques of G. Potamianos et al., "A Cascade Visual Front End for Speaker Independent Automatic Speechreading," International Journal of Speech Technology, vol. 4(3–4), pp. 193–208, 2001, the disclosure of which is incorporated by reference herein, may be employed. For each video frame, a statistical face tracking methodology is used to define a region of interest to which a two-dimensional, separable, discrete cosine transform (DCT) is applied. The 24 highest energy (over all training data) DCT coefficients are retained and mean normalization is applied to compensate for lighting variations. No delta parameters are used. Of course, other video feature vectors may be employed.

The audio and video vector coefficients may further be processed via short-time Gaussianization which attempts to mitigate the effects on the mean and variance parameters of linear channel and additive noise distortions by locally mapping the features to the standard normal distribution. For example, the Gaussianization techniques described in B. Xiang et al., "Short-Time Gaussinization for Robust Speaker Verification," Proceedings of ICASSP, Orlando, Fla., May 2002, the disclosure of which is incorporated by reference herein, may be employed.

A description of the speaker models that may be employed in accordance with an illustrative embodiment of the invention will now be provided.

Speaker modeling is preferably based on a Gaussian Mixture Model (GMM) framework, for example, as described in D. A. Reynolds et al., "Robust Text-Independent Speaker Identification Using Gaussian Mixture Speaker Models," IEEE Transactions on Speech and Audio Processing, vol. 3, no. 1, January 1995, the disclosure of which is incorporated by reference herein. The speaker modeling may also include transformation-based enhancements described in U. V. Chaudhari et al., "Transformation Enhanced Multi-grained Modeling for Text-Independent Speaker Recognition," Proceedings of the International Conference on Spoken Language Processing (ICSLP), Beijing, October 2000, the disclosure of which is incorporated by reference herein, which use feature space optimizations on top of the initial feature sets.

These optimizations, via Maximum Likelihood Linear Transformation (MLLT) as described in R. A. Gopinath, "Maximum Likelihood Modeling with Gaussian Distributions for Classification," Proceedings of ICASSP, Seattle, May 1998, the disclosure of which is incorporated by reference herein, are conditioned on the models, which must therefore be built before the optimization. For each data stream s, and speaker j, the $N_s^j$-component model, $M_s^{j,o}$, is parameterized, prior to the feature space optimization, by $$\left\{ m_{s,i}^{j,o}, \sum_{s,i}^{j,o}, p_{s,i}^j \right\}_{i=1,\ldots,N_s^j},$$

including the estimates of the mean, covariance, and mixture weight parameters. Restriction to diagonal covariance models occurs in a transformed feature space where an MLLT transformation $T_s^j$ is chosen, via a gradient descent, to minimize the loss in likelihood that results from the restriction.

Consequently, the new model parameterization is:

$$M_s^j = T_s^j M_s^{j,o} \equiv \left\{ m_{s,i}^j, \sum_{s,i}^j, p_{s,i}^j \right\}_{i=1,\ldots,N_s^j},$$

where $$M_{s,i}^j = T_s^j M_{s,i}^{j,o} \text{ and } \sum_{s,i}^j = \text{diag}\left(T_s^j \sum_{s,i}^{j,o} T_s^{j,T}\right).$$ (5)

Note that the feature space optimization is carried out independently for each speaker model and each feature stream. As a result, each speaker model has its own associated feature space.

A description of discriminants with time-varying context-dependent parameters that may be employed in accordance with an illustrative embodiment of the invention will now be provided.

The invention preferably uses a modified likelihood based discriminant function that takes into account the added transformation described above. Given a set of vectors $X^s = \{x_t^s\}$ in $R^n$ from some stream s, the base discriminant function for any individual stream-dependent target model $M^j$ is:

$$d_s(x_t^s | M_s^j) = \max_i \left[\log p\left(T_s^j x_t^s | m_{s,i}^j, \sum_{s,i}^j, p_{s,i}^j\right)\right],$$ (1)

where the index i runs through the mixture components in the model $M_s^j$ and $p(\cdot)$ is a multi-variate Gaussian density. The multi-stream input to the identification system is $X = \{X^a, X^v\}$, a set of two streams with N vectors in each stream.

Thus, a general discriminant is defined with time-varying parameters for an N frame input as ($t \in \{1, \ldots, N\}$ and $s \in \{a, v\}$):

$$D(X | j) = \sum_t \sum_s [\Phi_t^s(j) + \Psi_t^s(j)] \eta_s d_s(x_t^s | M_s^j),$$ (2)

and $$D(X | j) = \sum_t \sum_s \Phi_t^s(j) + \Psi_t^s(j) \eta_s d_s(x_t^s | M_s^j).$$ (3)

where $\Phi_t^s(j)$ and $\Psi_t^s(j)$ are time, stream, and model dependent parameters that respectively measure the local congruence (or coverage or richness) of the test data with respect to the model and the stability (or consistency or predictability) of the score stream, and $\eta_s$ normalizes the scale of the scores. Note that there is a product and sum form of the combination. It is to be understood that $\Phi$ measures the match of the test data to the models and $\Psi$ measures the predictability of the score stream. They are the normalized parameters, as will be defined below, derived from $\phi_t^s(j)$ and $\psi_t^s(j)$.

A description of a coverage parameter that may be employed in accordance with an illustrative embodiment of the invention will now be provided.

To determine $\phi_t^s(j)$, which is a measure of the coverage of the model by the test data, the roles of the test and training data are inverted and an "inverse" likelihood is computed. That is, for a time t, a neighborhood (in time) of the test vector is modeled by a GMM, $M_{s,t}^{test}$, and the likelihood of the model parameters $M_s^j$, and/or training data (for $M_s^j$) is measured with respect to the test data model in computing the parameter. In its generalized form, the coverage parameter equation is:

$$\phi_t^s(j) = \sum_i a_{s,i}^j d_s(m_{s,i}^j | T_s^j M_s^{test})$$ (4)

where $T_s^j M_{s,t}^{test}$ denotes transformation of the test model in to $M_s^j$'s feature space and $a_{s,i}^j$ is a constant proportional to $p_{s,i}^j$ and $|\Sigma_{s,i}^j|$, the determinant of the diagonal matrix in the optimal model feature space. In the sum, i ranges over all the components of $M_s^j$.

Figure 2:
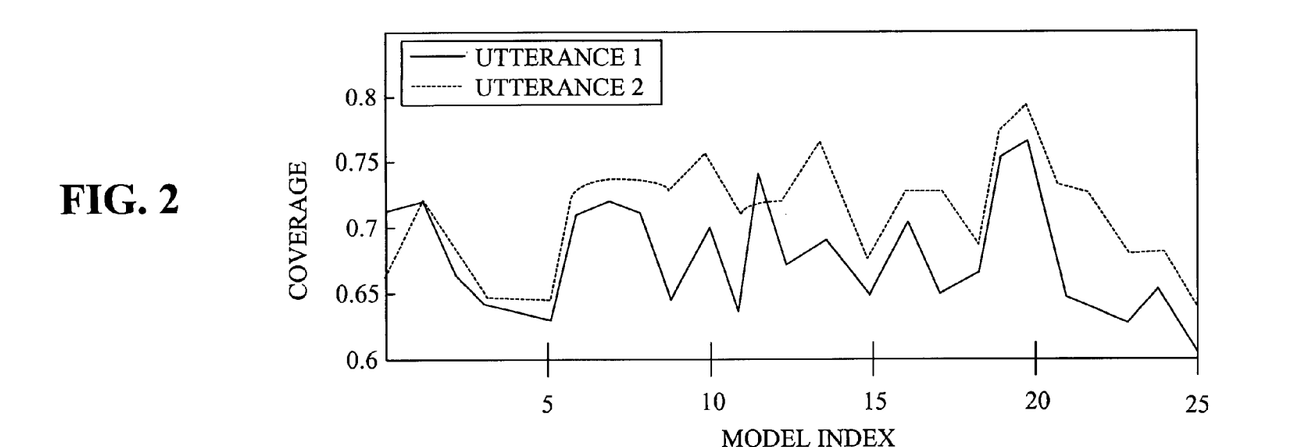
FIG. 2 is a diagram illustrating behavior of a coverage parameter computed by an authentication system, according to an embodiment of the present invention.

Referring now to FIG. 2, a diagram illustrates the behavior of a coverage parameter computed by an authentication system, according to an embodiment of the present invention. More specifically, FIG. 2 graphically illustrates normalized coverage for 25 models over two different utterances (i.e., Utterance 1 and Utterance 2). Normalization will be described below.

The major trend over the models can be seen in FIG. 2 to be relatively consistent for the two utterances, which indicates the relative richness of the training data for the 25 models used. However, there are a fair number of models where the values diverge, indicating the variable relative richness of the test data (in the two utterances). The power of this measure lies in the fact that $\phi$ is not symmetric with respect to the roles of the training and test data. A high concentration of test data near one model component can yield a high likelihood, yet when the roles are reversed, and the model is built on the test data, the training data means and/or vectors could have a very low likelihood, indicating that the training data is much richer in comparison to the test data. One can associate $\phi$ with the fraction of the model covered by the test data.

A description of a stability parameter that may be employed in accordance with an illustrative embodiment of the invention will now be provided.

The parameter $\psi_t^s(j)$ is computed using the deviation of the score at time t from a point estimate of the score at time t, based on a neighborhood (in time) of test vectors $X_{nbhd}^s$ (the size of this neighborhood is, in general, independent of that used for determining $\phi$). The parameter $\psi_t^s(j)$ is a measure of the relative instability of the data stream at time t and is defined as:

$$\psi_t^s(j) = \beta_{s,t}^j \frac{d_s(x_t^s | M_s^j) - \mu[d_s(x^s | M_s^j); x^s \in X_{nbhd}^s]}{\sigma[d_s(x^s | M_s^j); x^s \in X_{nbhd}^s]}$$ (5)

Notice that value $\beta_{s,t}^j$ should ensure that $\psi_t^s(j)$ is positive.

Figure 3:
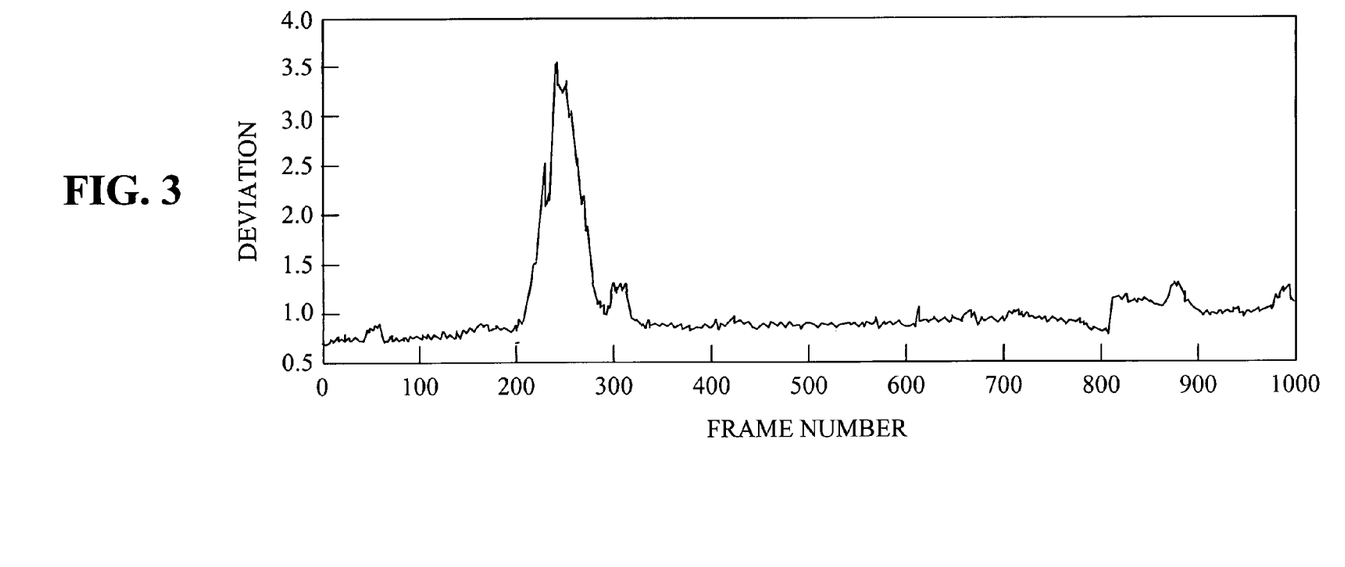
FIG. 3 is a diagram illustrating behavior of a stability parameter computed by an authentication system, according to an embodiment of the present invention.

Referring now to FIG. 3, a diagram illustrates the behavior of a stability parameter computed by an authentication system, according to an embodiment of the present invention. More specifically, FIG. 3 graphically illustrates a video stream deviation for a 1000 frame section. While the deviation shown typically hovers closely to a constant value, there are a number of sections where the deviation becomes quite large. The $\psi$ parameter is related to the $\phi$ factor in that an unstable score stream can be the result of the differing richness of the training and test data. However, as one does not necessarily imply the other, it is advantageous to use both parameters.

A description of a normalization operation that may be employed in accordance with an illustrative embodiment of the invention will now be provided.

It is to be understood that $\Phi$ and $\Psi$ are normalized parameters based on $\phi$ and $\psi$ and are defined as:

$$\Phi_t^s(j) = \phi_t^s(j) \Big/ \sum_{q \in \{a,v\}} \phi_t^q(j),$$

$$\Psi_t^s(j) = (1/\psi_t^s(j)) \Big/ \sum_{q \in \{a,v\}} (1/\psi_t^q(j)).$$

Such normalization induces a context dependence since the weights on one stream depend on the other. The reciprocal is used in computing $\Psi$ because it is desired that the factor be inversely proportional to the deviation. The $\eta_s$ parameter, incorporating the normalization for the scale differences in the score streams, is set (based on empirical performance) to $1/\mu_{s,global}$, which is the reciprocal of the mean value of the stream elements to be combined, taken over a large enough sample of data so that the mean value is practically constant.

Note that while the explanation above used two streams, the number of streams is not so limited. In the case of more than two streams, the coverage and deviation parameters may be computed for each stream, and the normalization step is implemented such that the sums are over all of the streams. Also, the number of scores added together to form the discriminants is increased by the number of additional data streams.

Accordingly, in accordance with the above-described parameters and discriminants of the present invention, speaker authentication is carried out by computing equation (2) or (3) for each speaker j, and letting the decision be given by:

$$id = \arg\max_j D(X \mid j).$$

Figure 4:
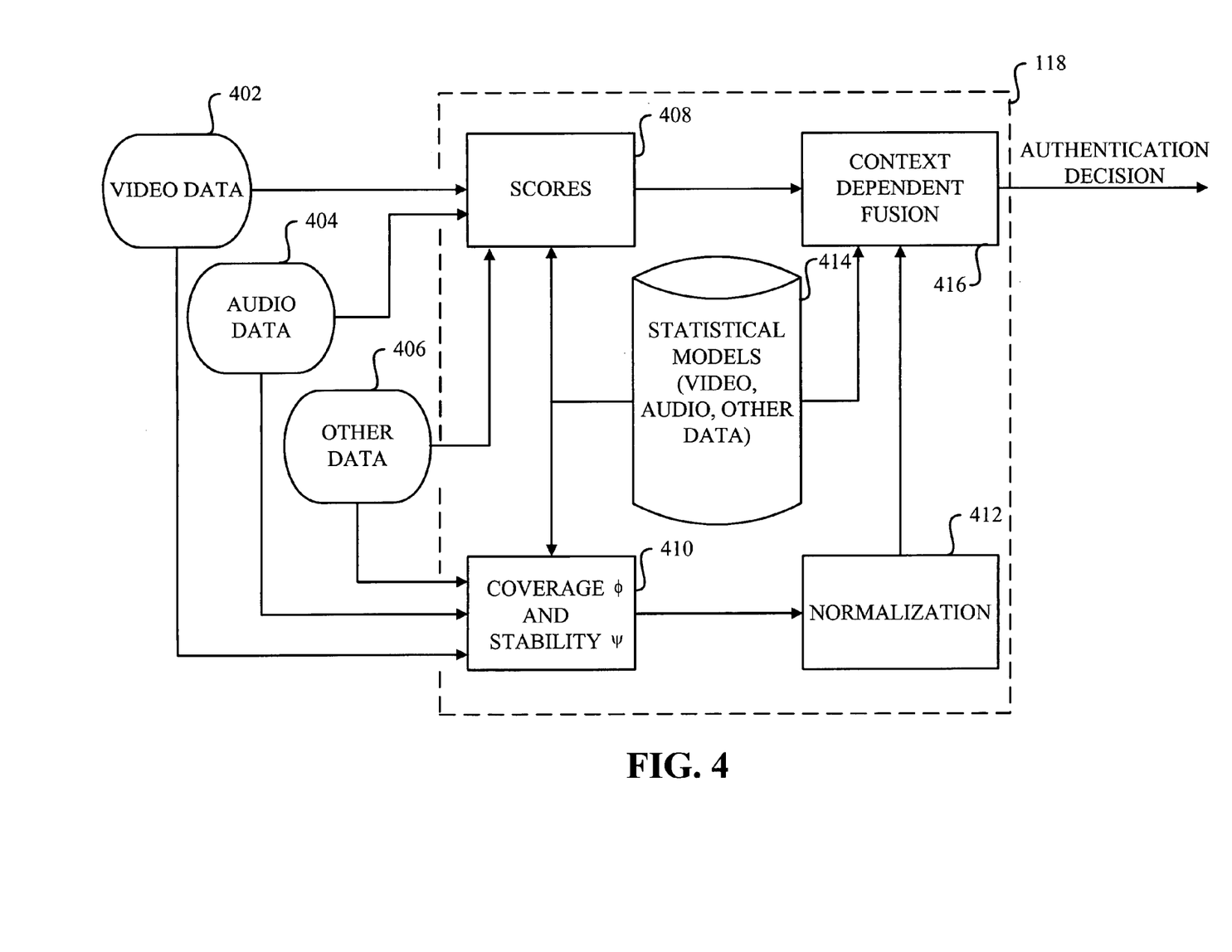
FIG. 4 is a block/flow diagram illustrating an authentication methodology for implementation in an authentication system, according to an embodiment of the present invention.

Referring now to FIG. 4, a block/flow diagram illustrates an authentication methodology for implementation in an authentication system, according to an embodiment of the present invention. It is to be appreciated that the diagram in FIG. 4 depicts the functional processing blocks and data flow involved in the time-varying stream reliability prediction-based authentication methodology described above. Note that FIG. 4 shows that additional data (e.g., GPS data) may be employed in the methodology. The addition of this other data type is straightforward given the above detailed explanation of how audio and video data streams are processed to make an authentication decision. That is, the use of this additional data type is the same as the use of the audio and video data, i.e., statistical models are built and frame scores are obtained, the frame scores are then combined according the weightings such as are defined above in the explanation of normalization.

As shown, FIG. 4 depicts details of authentication system 118 (FIG. 1). Authentication system 118 receives multiple data streams in the form of video data 402, audio data 404 and other data 406 (e.g., GPS data). Recall that these streams are processed to form the feature streams described above. The authentication system 118 comprises the following blocks: score computation module 408, coverage parameter $\phi_t^s(j)$ and stability parameter $\psi_t^s(j)$ computation module 410, normalization module 412, statistical model store 414, and context dependent fusion module 416.

In accordance with these modules, authentication of a speaker may be performed as follows.

As shown, multiple streams of data including video data 402, audio data 404 and other data (e.g., GPS data) 406 are simultaneously obtained in association with the individual, i.e., speaker j. This step is illustratively described above. Each stream is provided to both the score computation module 408 and the coverage and stability parameters computation module 410.

In the score computation module 408, scores are computed for each time interval t (e.g., frame) by comparing the input video data 402, the audio data 404 and the GPS data 406 with the corresponding statistical models previously trained and stored in model store 414 (e.g., audio data to audio models, video data to video models, GPS data to GPS models). While scores associated with audio data and video data are understood to represent likelihoods or probabilities as are well known, GPS models and scores may involve the following. GPS models may be built from an output of a GPS tracking system and represent specific GPS tracking coordinates. With regard to GPS data scoring, when the speaker is at a location at which he normally resides, a higher score will be generated, as compared to a score generated when the speaker is at a location other than a normal or expected location.

In computation module 410, the coverage parameter $\phi$ is computed, as explained above, for each stream s (audio, video, GPS) at time interval t for speaker j, in accordance with the training models stored in block 414. Recall that the coverage parameters represent the relative richness of the training models, i.e., they represent a measure of the coverage of the models by the input test data.

Further, in computation module 410, the stability parameter $\phi$ is also computed, as explained above, for each stream s (audio, video, GPS) at time intervals t for speaker j. Recall that the stability parameter represents a deviation of a score at time t from a point estimate of the score at time t.

In normalization module 412, the coverage and stability parameters are normalized, as explained above, to induce a context dependence. Then, in context dependent fusion module 416, the scores generated in block 408 are summed based on the weights produced in accordance with the normalization operation. Lastly, the scores over all frames are summed based on the weights. The result is considered the result of the computation of the discriminant described above in accordance with equations (2) or (3). Advantageously, using the parameters described herein, the authentication system is able to predictively take into account the time-varying nature of the data streams obtained from the individual.

It is to be understood that the output of the fusion module 416 may take several forms. However, in one preferred form, the output comprises a composite score (summed in accordance with the weights) for each training model stored in store 414. Based on the score, an identification or verification decision is computed. For example, identification is the process whereby the model with the highest score or result is chosen. Verification compares the score of the model associated with a claimed identity to that of the background model, accepting or rejecting the claim based on the difference. Thus, in addition to the composite score, or as an alternative to the composite score, module 416 may output an authentication decision message (e.g., message indicating that the subject individual or entity is "authenticated" or "not authenticated").

Figure 5:
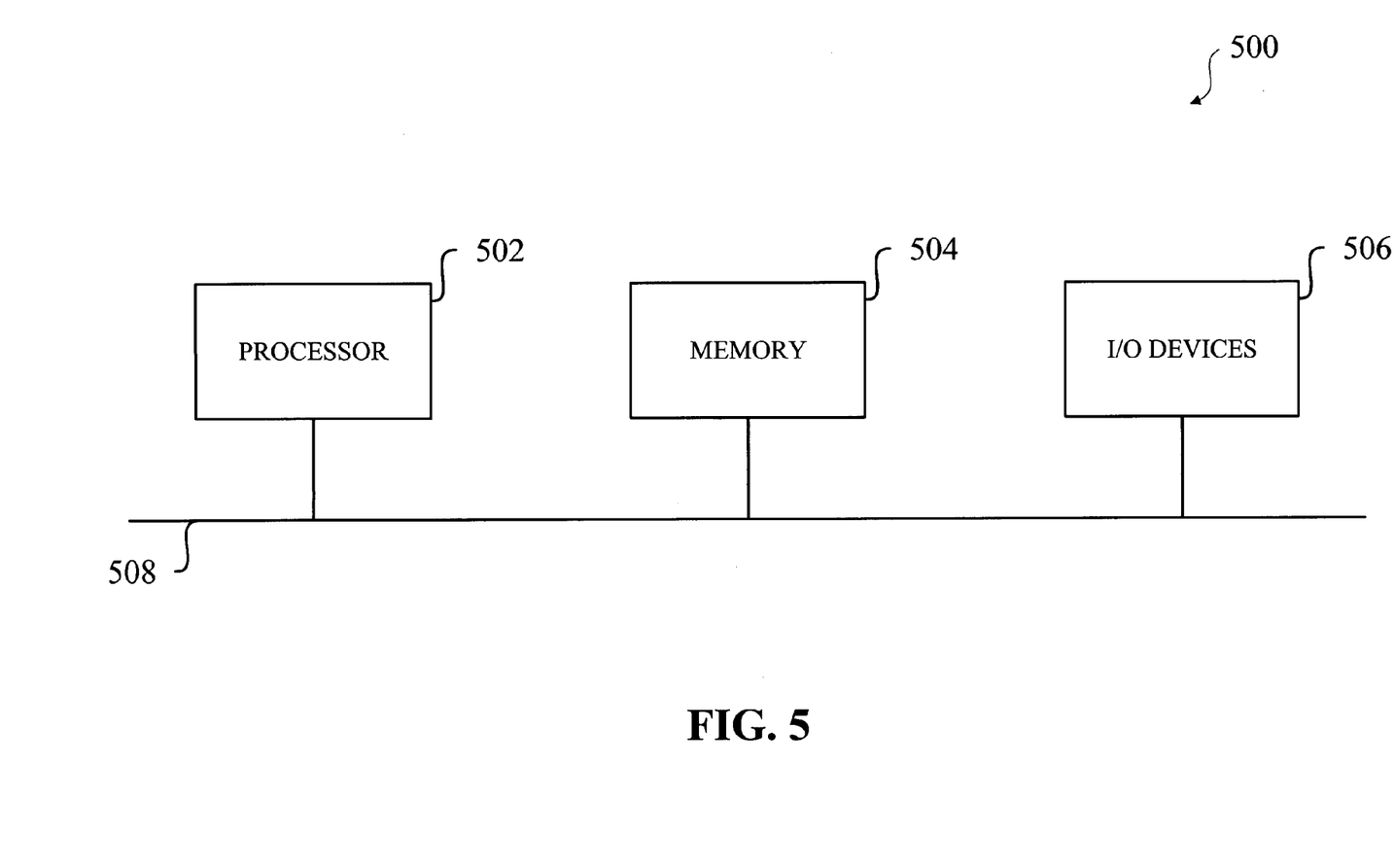
FIG. 5 is a block diagram illustrating an exemplary computing system environment for implementing an authentication system, according to an embodiment of the invention.

Referring now to FIG. 5, a block diagram illustrates an exemplary computing system environment for implementing an authentication system, according to one embodiment of the invention. It is to be understood that an individual or user may interact with the system locally or remotely. In the local case, the individual/user interacts directly with the computing system embodying the system. In the remote case, the individual/user interacts with the computing system (e.g., server) embodying the system via another computing system (e.g., a client or client device), wherein the client and server communicate over a distributed network. The network may be any suitable network across which the computer systems can communicate, e.g., the Internet or World Wide Web, local area network, etc. However, the invention is not limited to any particular type of network. In fact, it is to be understood that the computer systems may be directly linked without a network.

As shown, the computing system 500 comprises a processor 502, memory 504 and I/O devices 506, all coupled via a computer bus 508. It should be understood that the term "processor" as used herein is intended to include one or more processing devices, including a central processing unit (CPU) or other processing circuitry, e.g., digital signal processor, application-specific integrated circuit, etc. Also, the term "memory" as used herein is intended to include memory associated with a processor or CPU, such as RAM, ROM, a fixed, persistent memory device (e.g., hard drive), or a removable, persistent memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. Further, the I/O devices associated with the computing system 800 are understood to include those devices and processing equipment necessary to capture and process the particular data associated with an individual/user, as mentioned in detail above with respect to the capturing of the multiple data streams.

It is also to be understood that the computing system illustrated in FIG. 5 may be implemented in the form of a variety of computer architectures, e.g., a personal computer, a personal digital assistant, a cellular phone, a microcomputer, a minicomputer, etc. However, the invention is not limited to any particular computer architecture.

Accordingly, software instructions or code for performing the methodologies of the invention, as described herein, may be stored in one or more of the associated memory devices, e.g., ROM, fixed or removable memory, and, when ready to be utilized, loaded into RAM and executed by the CPU.

A description of some experimental results obtained in accordance with an illustrative embodiment of the invention will now be provided.

The experiments described below are based on an audio-visual database including 304 speakers. The speech and audio were captured as the users read prompted text while in front of a computer that was equipped with a microphone and camera. For each speaker, approximately 120 seconds of speech was used for training and on average the test utterances were 6.7 seconds long with a standard deviation of 2.7. Experiments were conducted at both the utterance level and frame level. For the frame level experiments, a 100 speaker subset of the data was chosen to reduce computation and storage costs. The total number of tests for the full (All) and reduced (100spkr) sets are 19714 and 7307 respectively.

Figure 6:
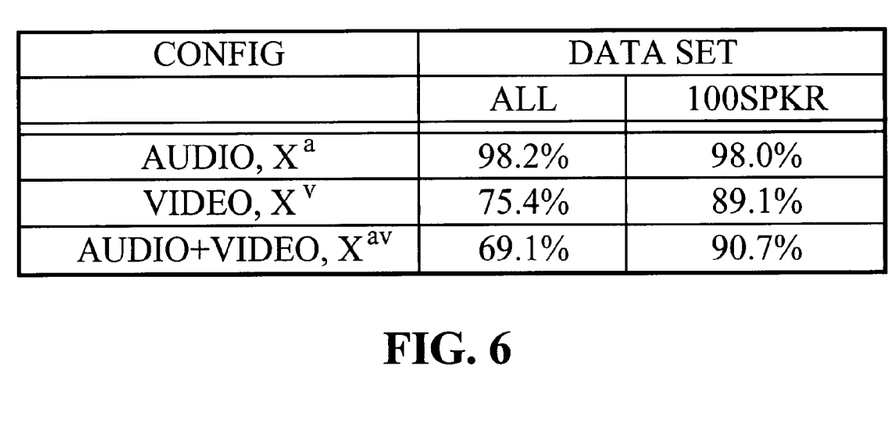
FIG. 6 is a diagram tabularly illustrating authentication rates obtained in experiments conducted in accordance with the invention.

Results (authentication rates) are given in FIG. 6 for the cases where the three streams $X^a$, $X^v$, and $X^{av}$ are used in isolation (there is no score combination or weighting). Recall that $X^{av}$ is the vector-wise concatenation of $X^a$ and $X^v$. The discriminant in these cases is $D(X|j)=\Sigma_t d_s(x_t^s|M_s^j)$, where s is either a, v, or av. As can be seen from the results in FIG. 6, vector-wise concatenation can be detrimental. It is evident that the speakers for whom good video data existed and still preserved the base audio error rate were chosen for the reduced 100spkr set. Also, for the sake of comparison, results are given for the case where the streams are weighted with a constant factor for all time, i.e.:

$$D(X|j) = \sum_t [w_a d_a(x_t^a|M_a^j) + (1-w_a)d_v(x_t^v|M_v^j)].$$

The authentication performance on the 100spkr set is computed on a grid of weights ranging from 0.0 to 0.1. The boundary error rates are the same as in FIG. 6. It may be observed that there is a monotonic increase in accuracy until the fraction of audio goes beyond 0.9, where the performance peaks at 98.9 percent, showing some benefit of adding video to the audio system.

Figure 7:
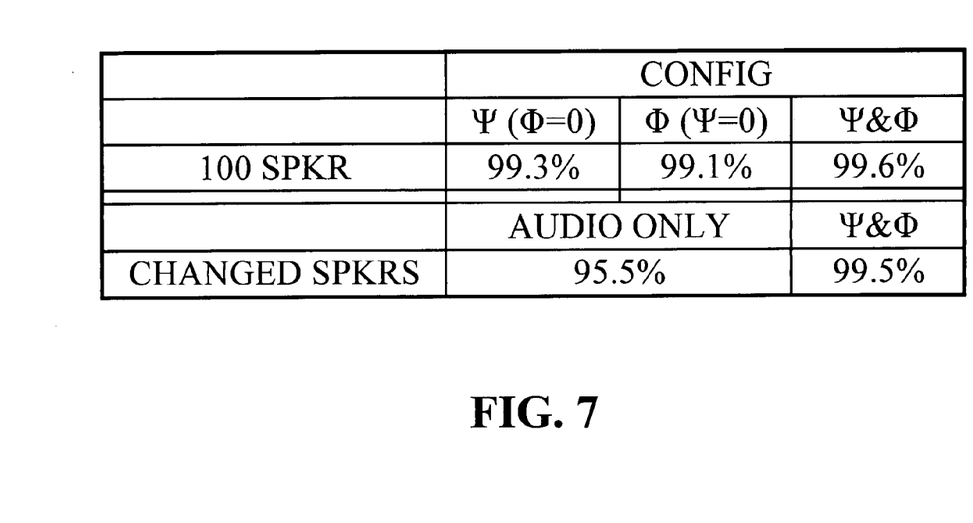
FIG. 7 is a diagram tabularly illustrating performance rates obtained in experiments conducted in accordance with the invention.

FIG. 7 focuses on the reduced 100spkr population and the frame-level combination experiments. In FIG. 7, the effects of using the time and context dependent weights ($\Phi$ and $\Psi$) in isolation and together, using the sum form (equation (2) above), are shown. Using either parameter in isolation is beneficial, but using both together clearly outperforms all cases. If the speakers for whom at least one decision (for one test utterance) changed are considered, 27 speakers whose tests account for 3131 trials are obtained. The improvement for these speakers (over the audio only case) is given in FIG. 7.

Accordingly, as explained in detail above, the present invention provides a methodology for combining information present in two or more streams of data. The invention realizes that the quality of data and the richness of the testing data relative to the training data vary over time and in fact within the boundaries of an utterance. A notion of data reliability is provided incorporating the stability, or point consistency, of a score stream and the coverage of the model by the test data. Experiments showed that this decision method outperformed the use of audio alone, video alone, or a concatenation of the streams. The results are significant because they are obtained for the clean speech case, for which it was previously questioned whether adding video data could improve performance.

Furthermore, as explained above, the techniques of the invention can, more generally, be used for a variety of joint processing/decision making operations when two or more data streams are involved. By way of example only, based on a determination of what words are being spoken, an emotional state, etc., the invention can use this information to make buy/sell decisions when one stream is the stock price and the other stream is volume. Also, the data streams may include data other than audio and video, e.g., GPS readings, keyboard strokes, gait, electrocardiogram readings, etc. Still further, the data streams may be "derived data" streams, e.g., a word sequence derived from speech or lip reading, etc. In addition to making decisions, the coverage measure and/or stability measure can be used as confidence measure to either not make a decision or delay the decision until coverage and/or stability exceeds a threshold value.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of generating a decision associated with one of an individual and an entity, the method comprising the steps of:

inputting two or more data streams associated with one of the individual and the entity;

computing at least one time-varying measure in accordance with the two or more data streams;

computing a decision output value based on the at least one time-varying measure; and authenticating one of the individual and the entity based on the decision output value;

wherein the at least one time-varying measure comprises a measure of the coverage of a model associated with previously-obtained training data by at least a portion of the captured data, further wherein the coverage measure is determined in accordance with an inverse likelihood computation, the inverse likelihood computation comprising modeling, for a time t, a neighborhood of a test vector associated with the captured data to generate a test data model, and measuring the likelihood of one or more parameters of the training data model with respect to the test data model.

2. The method of claim 1, wherein the decision is not computed until the at least one time-varying measure is one of greater than and equal to a given threshold value.

3. The method of claim 1, wherein the decision is a speaker authentication decision.

4. The method of claim 1, wherein the two or more data streams comprise two or more of audio data, video data, and other data relating to one of the individual and the entity.

5. The method of claim 1, wherein the feature space associated with the test data model is transformed into the feature space associated with the training data model.

6. The method of claim 1, wherein the two or more data streams comprise data derived from the data associated with one of the individual and the entity.

7. The method of claim 1, wherein the measure computation step further comprises computing a second time-varying measure associated with the two or more data streams.

8. The method of claim 7, wherein the at least one time-varying measure and the second time-varying measure comprise a coverage measure and a stability measure.

9. The method of claim 1, wherein the at least one time-varying measure is normalized.

10. The method of claim 9, wherein the normalization induces a context dependence.

11. A method of generating a decision associated with one of an individual and an entity, the method comprising the steps of:

inputting two or more data streams associated with one of the individual and the entity;

computing at least one time-varying measure in accordance with the two or more data streams;

computing a decision output value based on the at least one time-varying measure; and authenticating one of the individual and the entity based on the decision output value;

wherein the at least one time-varying measure comprises a measure of the stability of at least a portion of the captured data.

12. The method of claim 11, wherein the stability measure is determined in accordance with a deviation computation.

13. The method of claim 12, wherein the deviation computation comprises computing a deviation of a score at time t from a point estimate of the score at time t based on a neighborhood of test vectors associated wit the inputted data.

14. A method of generating a decision associated with one of an individual and an entity, the method comprising the steps of:

inputting two or more data streams associated with one of the individual and the entity;

computing at least one time-varying measure in accordance with the two or more data streams;

computing a decision output value based on the at least one time-varying measure; and authenticating one of the individual and the entity based on the decision output value;

wherein the measure computation step further comprises computing a second time-varying measure associated with the two or more data streams, and the at least one time-varying measure and the second time-varying measure comprise a coverage measure and a stability measure;

further wherein the measure computation step further comprises the steps of:

computing the coverage measure and the stability measure for each data stream;

normalizing the coverage measure and the stability measure over the two or more data streams; and forming discriminants by combining scores obtained from the captured data based on the normalized measures, the discriminants being used to compute the decision.

15. Apparatus for generating a decision associated with one of an individual and an entity, the apparatus comprising:

a memory; and at least one processor coupled to the memory and operative to: (i) input two or more data streams associated with one of the individual and the entity; (ii) compute time-varying measures in accordance with the two or more data streams; (iii) compute a decision output value based on the time-varying measures; and (iv) authenticate one of the individual and the entity based on the decision output value;

wherein the measure computation operation further comprises:

computing a coverage measure and a stability measure for each data stream;

normalizing the coverage measure and the stability measure over the two or more data streams; and forming discriminants by combining scores obtained from the captured data based on the normalized measures, the discriminants being used to compute the decision.

16. The apparatus of claim 15, wherein the decision output value is a speaker authentication decision.

17. The apparatus of claim 15, wherein the two or more data streams comprise two or more of audio data, video data, and other data relating to one of the individual and the entity.

18. The apparatus of claim 15, wherein the two or more data streams comprise data derived from the data associated with one of the individual and the entity.

19. An article of manufacture for generating a decision associated with one of an individual and an entity, comprising a machine readable medium containing one or more programs which when executed implement the steps of:
   inputting two or more data streams associated with one of the individual and the entity;
   computing time-varying measures in accordance with the two or more data streams;
   computing a decision output value based on the time-varying measures; and
   authenticating one of the individual and the entity based on the decision output value;
   wherein the measure computation step further comprises:
      computing a coverage measure and a stability measure for each data stream;
      normalizing the coverage measure and the stability measure over the two or more data streams; and
      forming discriminants by combining scores obtained from the captured data based on the normalized measures, the discriminants being used to compute the decision.

* * * * *

UNITED STATES PATENT AND TRADEMARK OFFICE
CERTIFICATE OF CORRECTION

PATENT NO. : 7,228,279 B2 Page 1 of 1
APPLICATION NO. : 10/397762
DATED : June 5, 2007
INVENTOR(S) : U. V. Chaudhari et al.

It is certified that error appears in the above-identified patent and that said Letters Patent is hereby corrected as shown below:

In the Specification:

Col. 7, line 22, please delete "$M^{Sj}$" and insert -- $M_s^j$ --.

Col. 7, line 41, please delete "and" and insert -- or --.

Signed and Sealed this

Twenty-eighth Day of August, 2007

JON W. DUDAS
*Director of the United States Patent and Trademark Office*